(12) United States Patent
Taylor (10) Patent No.: US 10,950,007 B2
(45) Date of Patent: Mar. 16, 2021

(54) COLOR-BASED TOY IDENTIFICATION SYSTEM

(71) Applicant: Hasbro, Inc., Pawtucket, RI (US)

(72) Inventor: Benjamin Parry Taylor, Kanagawa (JP)

(73) Assignee: Hasbro, Inc., Pawtucket, RI (US)

( * ) Notice: Subject to any disclaimer, the term of this patent is extended or adjusted under 35 U.S.C. 154(b) by 50 days.

(21) Appl. No.: 16/259,382

(22) Filed: Jan. 28, 2019

(65) Prior Publication Data

US 2019/0244392 A1 Aug. 8, 2019

Related U.S. Application Data

(60) Provisional application No. 62/627,811, filed on Feb. 8, 2018.

(51) Int. Cl.
*G06T 7/90* (2017.01)
*G06K 9/20* (2006.01)
*G06K 9/46* (2006.01)

(52) U.S. Cl.
CPC .............. *G06T 7/90* (2017.01); *G06K 9/2063* (2013.01); *G06K 9/4652* (2013.01); *G06T 2207/10024* (2013.01); *G06T 2207/30204* (2013.01)

(58) Field of Classification Search
None
See application file for complete search history.

(56) References Cited

U.S. PATENT DOCUMENTS

| 6,069,696 | A | 5/2000 | McQueen et al. |
| 6,396,599 | B1 | 5/2002 | Patton et al. |
| 6,431,446 | B1 | 8/2002 | Gu et al. |
| 6,678,407 | B1 | 1/2004 | Tajima |
| 6,697,079 | B2 | 2/2004 | Rose |
| 6,897,426 | B2 * | 5/2005 | Etienne-Cummings ..... G06K 9/605 250/208.1 |
| 7,166,011 | B2 | 1/2007 | Schneck et al. |
| 7,180,524 | B1 | 2/2007 | Axelrod |

(Continued)

FOREIGN PATENT DOCUMENTS

WO WO-2018032630 A1 * 2/2018 ............. G09B 19/22

OTHER PUBLICATIONS

Das et al., "Indexing Flower Patent Images using Domain Knowledge," Department of Computer Science, University of Massachusetts, IEEE Intelligent Systems, vol. 14, Issue 5, Sep. 1999, doi: 10.1109/5254.796084, pp. 24-33 (15 total pages).

*Primary Examiner* — Mohammed Rachedine
(74) *Attorney, Agent, or Firm* — DiBerardino McGovern IP Group LLC (57) ABSTRACT

A toy is identified by locating a marker within image data that includes data that represents a toy and data that represents the marker; obtaining one or more marker samples, each of the one or more marker samples including a measured value of a color metric of the marker; determining a color metric offset based on the one or more marker samples and a known value of the color metric of the marker; obtaining one or more toy samples, each of the one or more toy samples including a measured value of the color metric of the toy; applying the determined color metric offset to at least one of the toy samples to determine a corrected color metric of the toy; and identifying the toy as a particular toy based on the corrected color metric of the toy.

20 Claims, 7 Drawing Sheets

(56) References Cited

U.S. PATENT DOCUMENTS

| | | |
|---|---|---|
| 7,486,300 B2 | 2/2009 | Rose |
| 7,502,033 B1 | 3/2009 | Axelrod |
| 8,126,264 B2 | 2/2012 | Kaftory et al. |
| 8,532,372 B2 | 9/2013 | Youngman et al. |
| 8,576,241 B1 | 11/2013 | Kanter et al. |
| 8,814,048 B2 | 8/2014 | Taylor |
| 9,047,633 B2 | 6/2015 | Gershon et al. |
| 9,436,704 B2 | 9/2016 | Gershon et al. |
| 9,607,404 B2 | 3/2017 | Gershon et al. |
| 9,633,448 B1 | 4/2017 | Dorner |
| 9,727,977 B2 | 8/2017 | Mullins et al. |
| 9,884,254 B2 | 2/2018 | Yim et al. |
| 2002/0126328 A1 | 9/2002 | Lehmeier et al. |
| 2002/0150291 A1 | 10/2002 | Naf et al. |
| 2005/0163369 A1 | 7/2005 | Jyou et al. |
| 2014/0244392 A1 | 8/2014 | Chang |
| 2014/0314327 A1* | 10/2014 | Elliott ................ G06K 9/00221 382/209 |
| 2017/0304732 A1* | 10/2017 | Velic .................. G06K 9/00201 |

\* cited by examiner

COLOR-BASED TOY IDENTIFICATION SYSTEM

CROSS-REFERENCE TO RELATED APPLICATION

This application claims the benefit of U.S. Provisional Application No. 62/627,811, filed Feb. 8, 2018 and titled COLOR-BASED TOY IDENTIFICATION SYSTEM, which is incorporated herein by reference in its entirety.

TECHNICAL FIELD

This disclosure relates to color-based toy identification.

BACKGROUND

Persons of all ages enjoy playing and interacting with toys. A manufacturer of toys has knowledge of particular colors used in a certain toy or type of toy.

SUMMARY

In one general aspect, a method of identifying a toy as a particular one of a plurality of pre-identified toys includes locating a marker within image data based on one or more pre-known and optically detectable characteristics of the marker, the image data including data that represents a toy and data that represents the marker; obtaining one or more marker samples, each of the one or more marker samples including a measured value of a color metric of the marker; determining a color metric offset based on the one or more marker samples and a known value of the color metric of the marker; obtaining one or more toy samples, each of the one or more toy samples including a measured value of the color metric of the toy; applying the determined color metric offset to at least one of the toy samples to determine a corrected color metric of the toy; and identifying the toy as a particular one of a plurality of pre-identified toys based on the corrected color metric of the toy.

Implementations may include one or more of the following features. The color metric may be a hue. In some implementations, the portion of the image data that includes data that represents the toy does not include data that represents the marker.

More than one marker sample may be obtained, and the measured values of the marker samples may be averaged to determine an average marker sample. Determining the color metric offset may include determining the color metric offset based on the average marker sample and the known value of the color metric of the marker. Determining the color metric offset may include determining a difference between the average marker sample and the known value of the color metric of the marker. Applying the determined color metric offset to at least one of the toy samples may include adding the determined color metric offset to the measured value of the color metric of at least one toy sample.

The marker samples may be obtained from the image data, and the toy samples may be obtained from the image data. The toy samples and the marker samples may be obtained from separate and non-overlapping portions of the image data. The image data may be obtained from a single optical sensor.

The pre-known and optically detectable characteristics of the marker may include a shape of the marker, a size of the marker, a relative location of the marker, a reflectivity of the marker, and/or a texture of the marker.

Each of the pre-identified toys may be associated with a distinct range of color metric values, and identifying the toy as a particular one of a plurality of pre-identified toys based on the corrected color metric of the toy may include: determining which one of the distinct ranges of color metric values includes the corrected color metric of the toy; and identifying the toy as the particular toy associated with the determined one of the distinct ranges of color metric values. Each of the distinct ranges of color metric values may include a distinct range of hue values.

In some implementations, the one or more toy samples are samples of a first portion of the toy, and the corrected color metric of the toy includes a corrected color metric of the first portion of the toy, and the method also includes obtaining one or more second toy samples, the second toy samples including a measured value of the color metric of a second portion of the toy, the second portion of the toy being spatially distinct from the first portion; and applying the determined color metric offset to at least one of the second toy samples to determine a corrected color metric of the second portion of the toy. Identifying the toy as a particular one of a identifying the toy as a particular one of a plurality of pre-identified toys based on the corrected color metric of the toy includes identifying the toy based on the corrected color metric of the first portion of the toy and the second portion of the toy.

In another general aspect, a toy identification system includes a detection system configured to capture image data, the detection system being configured to: locate a marker within image data based on one or more pre-known and optically detectable characteristics of the marker, the image data including data that represents a toy and data that represents the marker; obtain one or more marker samples, each of the one or more marker samples including a measured value of a color metric of the marker; determine a color metric offset based on the one or more marker samples and a known value of the color metric of the marker; obtain one or more toy samples, each of the one or more toy samples including a measured value of the color metric of the toy; apply the determined color metric offset to at least one of the toy samples to determine a corrected color metric of the toy; and identify the toy as a particular one of a plurality of pre-identified toys based on the corrected color metric of the toy.

In another general aspect, a method of identifying a toy includes: determining that a toy is in a toy region of a play surface; directing a user to position the toy relative to a detection system such that a first portion of the toy is in the field of view of an optical sensor of the detection system; obtaining one or more first portion samples, each of the one or more first portion samples including a measured value of a color metric of the first portion of the toy; determining a color metric offset based on the one or more first portion samples and a known value of the color metric of the first portion of the toy; obtaining one or more toy samples, each of the one or more toy samples including a measured value of the color metric of the toy in a second portion of the toy, the second portion of the toy being spatially distinct from the first portion of the toy and being a different color than the first portion; applying the determined color metric offset to at least one of the toy samples to determine a corrected color metric of the toy; and identifying the toy as a particular one of a plurality of pre-identified toys based on the corrected color metric of the toy.

Implementations of any of the techniques described above can include a toy system, a method, a process, a system, or computer instructions encoded on a non-transitory computer-readable medium. The details of one or more implementations are set forth in the accompanying drawings and the description below. Other features will be apparent from the description and drawings, and from the claims.

DESCRIPTION

Figure 1:
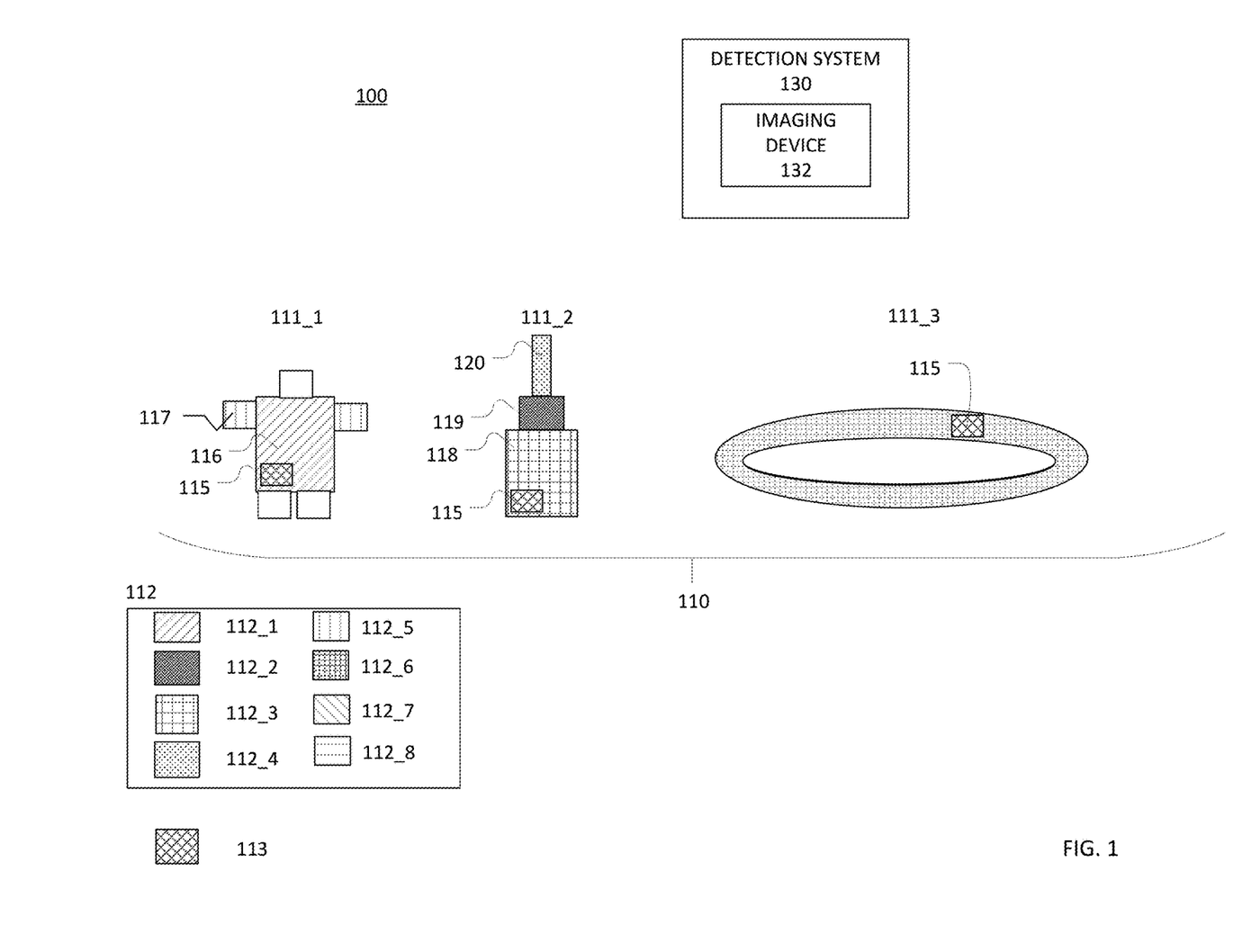
FIGS. 1 and 2 are block diagrams of examples of color-based toy identification systems.

A color-based object identification technique is disclosed. Referring to FIG. 1, a block diagram of a color-based toy identification system 100 is shown. The toy identification system 100 includes a toy collection 110 and a detection system 130, which includes an imaging device 132. The toy collection 110 includes n distinct toys, where n is a finite integer number of two or more. In the example of FIG. 1, the toy collection 110 includes three toys 111_1, 111_2, and 111_3. The toy 111_1 is a robot, the toy 111_2 is a construction set that includes a plurality of connectable blocks, and the toy 111_3 is a toy disk.

In the example of FIG. 1, toys of the toy collection 110 are each a different type of toy. However, the toy collection 110 may have a different make up. For example, in other implementations, the toy collection 110 may include many instances of the same toy, toys that are all the same type, toys that are of different types, or toys that are all from the same brand. For example, all of the toys in the toy collection 110 may be all the same type in that the collection 110 includes only transformable toys, pony toys, or building blocks. The toy collection 110 may include, for example, one type of toy but many different kinds of that type of toy. For example, the collection 110 may include different kinds of transformable toys, with some toys transforming from a robot into an animal and others transforming from a robot into a car. Moreover, the toy collection 110 may include all of the items from a particular brand of toys made by a manufacturer.

The toys of the toy collection 110 are made by the same manufacturer. For example, the toys of the toy collection 110 may all be made by the same company. Thus, the identity and characteristics (such as color) of each toy 111_1, 111_2, 111_3 is known to the manufacturer. The manufacturer selects the color or colors for each toy 111_1, 111_2, 111_3 from a collection of colors 112. In the example of FIG. 1, the collection of colors 112 includes eight colors 112_1, 112_2, 112_3, 112_4, 112_5, 112_6, 112_7, 112_8. Other examples may include more or fewer colors.

The toys in the collection 110 have different colors and/or different combinations of colors such that a particular toy in the collection 110 is distinguishable from the other toys in the collection 110 by color. The toy robot 111_1 includes a torso 116 that is the color 112_1 and arms 117 that are the color 112_5. The construction set 111_2 includes a base 118 that is the color 112_3 and blocks 119 and 120 that are the colors 112_2 and 112_4, respectively. The toy disk is the color 112_6.

Further, each toy in the toy collection 110 includes a marker 115 that is placed on the toy by the manufacturer. The marker 115 has a color 113 that is known to the manufacturer and also has one or more optically detectable characteristics that are not based on color. The one or more optically detectable characteristics of the marker 115 may include, for example, size and/or shape. The one or more optically detectable characteristics allow the marker 115 to be detected by the imaging device 132. The marker 115 may be small relative to the toy. For example, the largest extent of the marker 115 may be less than 10 millimeters.

In the example of FIG. 1, the marker 115 is rectangular. However, in other implementations, the marker 115 may have a more complex structure. For example, the marker 115 may have internal characteristics that are optically detectable and improve the ability of the detection system 130 to detect the marker 115. For example, the marker 115 may be a pre-formed and pre-decorated sticker or other attachable item that the manufacturer adheres to the toy, and the marker 115 may form a perceivable portion of the toy. In these implementations, the marker 115 may be an eye of the toy. The internal structure of the marker 115 in this example includes a pupil and an iris that are at a predefined distance from a perimeter of the eye. Additionally, the arrangement of the internal structure of the marker 115 is consistent among all toys that have that marker. Thus, the marker 115 may be detected more readily and more accurately than, for example, a marker that is painted on to a toy by hand. Moreover, the color of the marker 115 may be applied by a machine or other automated process, and the color of the marker 115 is thus also more consistent among different instances of the marker 115 than a feature that is painted on a toy manually. Thus, use of the marker 115 may result in a greater accuracy of toy identification.

The detection system 130 determines that a toy in the collection 110 is present by detecting an instance of the marker 115. The observed or measured color of the marker 115 is used to determine a color correction that is applied to portions of the detected toy that do not include the marker 115. The detected toy is identified as a particular toy based on the corrected color of the toy. The detection system 130 is created by the manufacturer and uses the manufacturer's knowledge of the characteristics of the toys 111_1, 111_2, 111_3 to provide a simple color-based identification technique that identifies toys quickly. The detection system 130 may be used, for example, in a manufacturing process or for inventory management. However, the detection system 130 may be implemented on computational device that is controlled by the end user of a toy in the collection 110. Thus, a consumer may use the detection system 130 to identify toys.

The color-based toy identification system 100 provides a robust yet simple detection and identification system that leverages the manufacturer's knowledge of color characteristics of the toys in the collection 110 to identify particular toys from among the various toys in the collection 110. The color-based toy identification system 110 also provides a technique that allows a relatively small spatial area (the marker 115) to be used to determine a color metric for a relatively large spatial area (the other portions of the toy aside from the marker 115). This may result in the system 100 being able to identify toys rapidly and with a relatively simple and inexpensive detection and identification apparatus.

Figure 2:
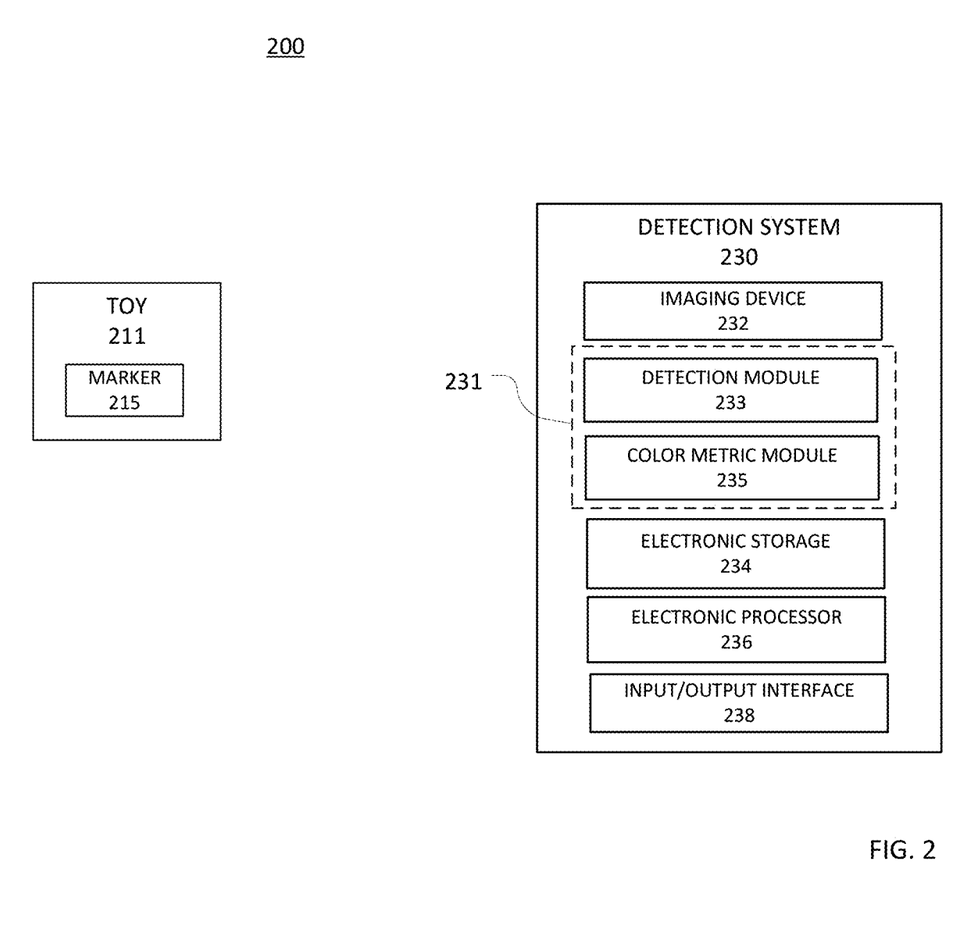

Referring to FIG. 2, a color-based toy identification system 200 is shown. The system 200 is an example of an implementation of the color-based toy identification system 100 of FIG. 1. The system 200 includes a detection system 230 that detects a marker 215 on a toy 211. The toy 211 is one toy of a collection of toys produced by a manufacturer. For example, the toy 211 may be a toy in the toy collection 110 (FIG. 1). The detection system 230 may be a system that is configured to be held by a user. For example, the detection system 230 may be implemented on a smart phone, such as an iPhone available from Apple Inc. of Cupertino, Calif.

The detection system 230 includes an imaging device 232 that is able to capture an image of the toy 211. The imaging device 232 is any type of optical sensor that is capable of forming an image. For example, the imaging device 232 may be a camera. The imaging device 232 may be capable of capturing a plurality of images, and may capture video of the toy 211. The imaging device 232 also may include electronics that control the optical sensor, such as electronics that provide power to the optical sensor and/or electronics that retrieve data and signals from the optical sensor. The imaging device 232 also may include mechanical components that hold the optical sensor and/or provide cooling for the optical sensor.

The detection system 230 also includes an electronic storage 234, an electronic processor 236, and an input/output interface 238. The electronic storage 234 may be volatile memory, such as RAM, or non-volatile memory. In some implementations, and the electronic storage 234 can include both non-volatile and volatile portions or components. The electronic processor 236 may be one or more processors suitable for the execution of a computer program such as a general or special purpose microprocessor, and any one or more processors of any kind of digital computer. Generally, a processor receives instructions and data from a read-only memory or a random access memory or both.

The electronic processor 236 can be any type of electronic processor and can be more than one electronic processor. The electronic storage 234 stores instructions, perhaps as a computer program, that, when executed, cause the processor 236 to communicate with other components in the detection system 230.

The detection system 230 also includes a toy identification module 231 that is configured to identify the toy 211 as a particular toy. The toy identification module 231 includes a detection module 233, which is configured to detect the marker 215 on the toy 211, and a color metric module 235, which is configured to determine a color-based correction that is applied to image data of the toy 211 and to identify the toy 211 as a particular toy based on the corrected color. The toy identification module 231, the detection module 233, and the color metric module 235 include logic, instructions, information, and/or data that allow detection and/or identification of the toy 211. For example, the toy identification module 231 may include instructions that implement the process discussed with respect to FIG. 3, and the color metric module 235 may include data that represents a color chart 435 discussed with respect to FIG. 4. The logic, instructions, information, and/or data included in the toy identification module 231, the detection module 233, and/or the color metric module 235 may be stored on the electronic storage 234.

Additionally, the toy identification module 231 may include instructions that cause other components of the detection system 230 to perform various functions. For example, the detection module 233 may include instructions that cause the imaging device 232 to acquire image data and/or video data of the toy 211. The detection module 233 also may include instructions that cause the acquired image and/or video data to be stored in the electronic storage 234.

Figure 3:
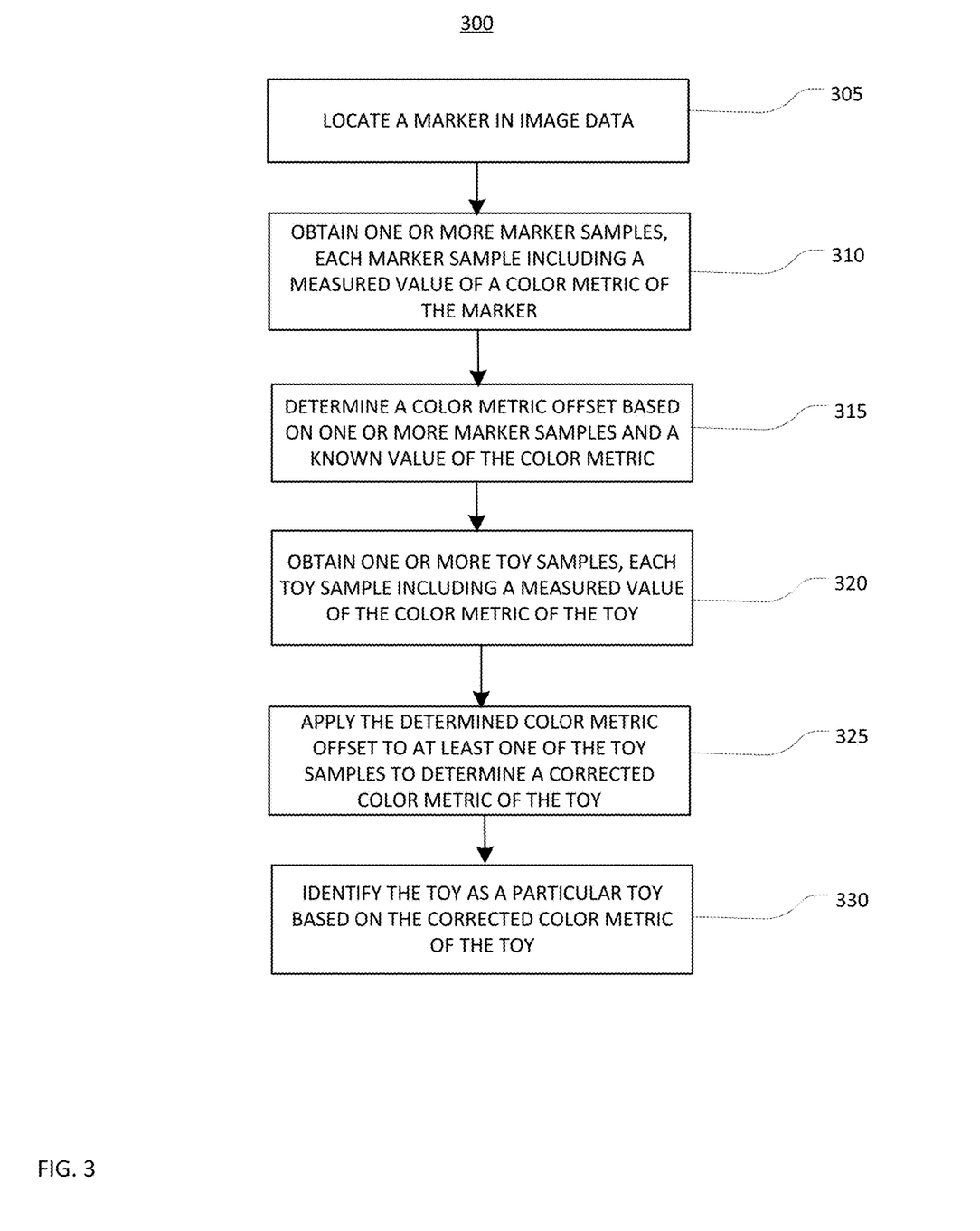
FIG. 3 is a flow chart of an example of a process for identifying a toy.

Referring to FIG. 3, a flow chart of a process 300 is shown. The process 300 is an example of a process for identifying a toy as a particular toy in a collection of pre-identified or pre-known toys. The toys are pre-identified or pre-known are toys that have characteristics that are known prior to the initiation of the process 300. For example, the colors of the toys are known prior to beginning to the process 300. Information representing the characteristics (such as the color) of each of the toys may be stored on the electronic storage 234 prior to beginning the process 300. For example, the color or colors of the toy 211 may be stored in association with the identity of that toy in a database or look-up table. The color and non-color characteristics of the marker 215 also may be stored on the electronic storage 234.

The process 300 may be performed by the electronic processor 236 of the detection system 230. The process 300 is discussed with respect to the detection system 230 of FIG. 2. However, the process 300 may be implemented by other detection systems. In the example of FIG. 3, the process 300 is used to identify the toy 211 (FIG. 2) as a particular toy in the collection 110 (FIG. 1). The process 300 and the detection system 230 may be used to detect other toys.

The marker 215 is located in image data (305). The image data may be collected by the imaging device 232. The image data may be, for example, a digital file or data structure that includes information that represents an image that includes the toy 211 and the marker 215. The image data is data that represents a visual depiction of a scene that includes the toy 211. The imaging device 232 may be a two-dimensional array of sensors that sense light in the visible spectrum. In these implementations, the image data may include a two-dimensional array of numerical data in which each value in the array represents a color detected by a particular sensor in the array. The values in the array may include a red-green-blue (RGB) value for each pixel. The RGB value of a particular pixel represents an amount of red, blue, and green present at a portion of a scene that corresponds to that pixel. The image data may be a collection of two-dimensional arrays of data collected at regular intervals, where each of the arrays is an image of the scene that includes the toy 211 at a particular time. In these implementations, the image data is video data.

Although the image data includes information about the colors present in the scene, the marker 215 is located in the image data without using color information. The marker 215 includes one or more optically detectable characteristics that are independent of the color of the marker 215. For example, the marker 215 may be a glyph or symbol that has a shape, reflectivity, texture, relative placement on the toy 211 and/or size that is known to the manufacturer of the toy 211. The marker 215 may be decorative a part of the toy 211. For example, the marker 215 may be the eyes of a doll toy. In some implementations, the marker 215 is not a decorative part of the toy 211. For example, the marker 215 may be or include a sticker or code (such as a Quick Response or QR code) affixed to the toy 211 by the manufacturer. Regardless, the marker 215 has known spatial characteristics and a known color.

The size and/or shape of the marker 215 may be detected through template matching, edge detection, and/or a pattern recognition technique. In some implementations, multiple candidate objects may be detected in the image data, and the objects may be scored or otherwise evaluated to determine which of the candidate objects is the marker 215. Moreover, in some implementations, data representing the candidate objects (or a template used to locate the marker 215) may be manipulated (for example, rotated or flipped about an axis) to improve the likelihood that a candidate object deemed to be the marker 215 is actually a detection of the marker 215.

One or more marker samples is obtained (310). Each marker sample includes a measured value of a color metric of a pixel that represents at least part of the marker 215. The measured color metric may be a hue. The hue is a numerical value that represents the degree to which a color is red, green, blue, and/or yellow. In some implementations, the measured value of the color metric also may include components that are outside of the visible spectrum. For example, the measured value of the color metric may include infrared components. In these implementations, the hue is a numerical value that also represents the degree to which the color metric has contributions from components that are outside of the visible spectrum.

The hue of a particular pixel of image data may be a single value determined from the RGB values associated with that pixel. In some implementations, the RGB values are used as the color metric. More than one marker sample may be obtained. For example, the hue for a plurality of pixels that each represent at least a portion of the marker 215 may be determined. In implementations in which more than one marker sample is obtained, the measured color metric may be the average of the measured color metrics of all of the marker samples. The measured color metric determined from the one or more marker samples is the color metric of the marker 215.

A color metric offset is determined based on the measured color metric of the marker 215 and a known value of the color metric of the marker 215 (315). The known value of the color metric is a representation of the actual color of the marker 215. For example, the manufacturer may affix the marker 215 to the toy 210 at the time of production, and the marker 215 has an actual color that is known to the manufacturer. The known value of the color metric of the marker 215 may be determined by the manufacturer from information about the actual color of the marker 215. For example, RGB values of an image of the marker 215 captured by the manufacturer may be used to determine the known value of the color metric at the time of manufacturing. In other examples, the known value of the color metric of the marker 215 is determined based on knowledge of the coloring products (such as colorant additives and/or pelletized beads used in injection molding and having a particular, known color) that the manufacturer uses to provide color to the toy 211.

The color metric offset represents a discrepancy between the measured color metric determined in (310) and the known color metric of the marker 215. The color metric offset is used to correct the colors in the portion of the image data that do not include the marker 215. The known value of the color metric of the marker 215 is compared to the determined color metric of the marker. For example, in implementations in which the color metric is the hue, the hue of the marker 215 determined in (310) may be subtracted from the actual, known hue of the marker 215 to determine the color metric offset.

One or more toy samples is obtained (320). The toy samples are pixels in the image data that represent portions of the toy 211 that do not include the marker 215. Each toy sample includes the same type of numerical values that the marker samples include. For example, each toy sample may be associated with RGB values. A measured color metric is determined for each toy sample. The measured color metric for the toy samples has the same characteristics as the measured color metric for the marker 215. For example, in implementations in which the measured color metric of the marker 215 is a hue determined from RGB values, the measured color metric for any toy sample is a hue based on RGB values associated with that sample.

The determined color metric offset is applied to at least one of the obtained toy samples to determine corrected toy samples (325). To apply the determined color metric offset to the obtained toy samples, a color metric is determined for the obtained toy samples. The color metric offset is then applied to the color metric determined for the obtained toy samples to determine a corrected color metric for the toy samples. For example, if the determined color metric offset is a hue value, the hue of the toy samples is determined and the color metric offset is added to the hue of the toy samples to form a corrected hue for the toy samples.

Figure 4:
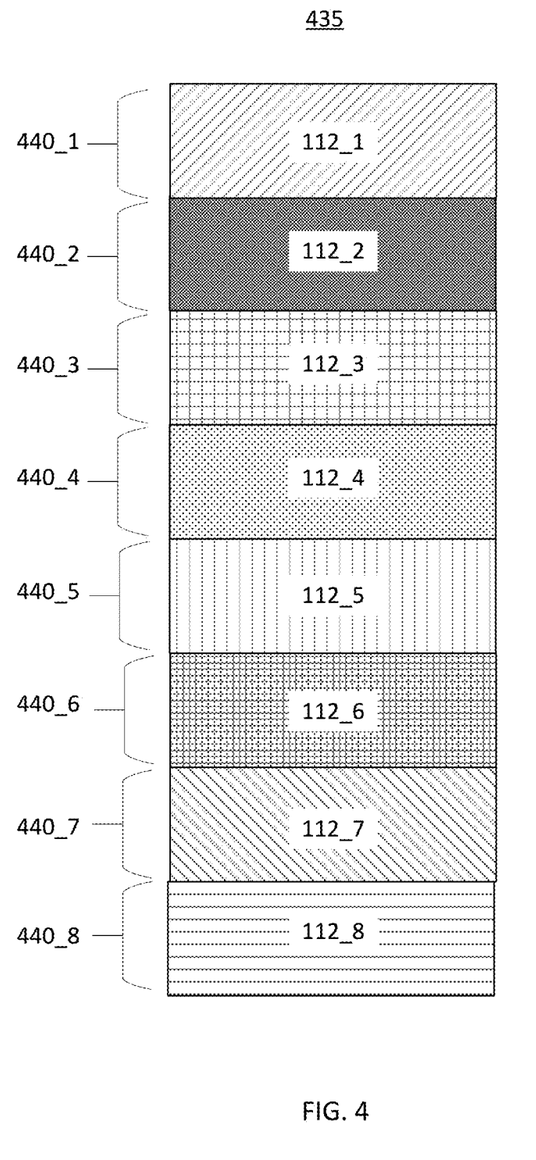
FIG. 4 is an example of a color chart that may be used in the identification systems of FIGS. 1 and 2.

The toy 211 is identified as a particular one of the toys in the collection 110 using the corrected color metric for the toy samples (330). Referring also to FIG. 4, the toy 211 is identified by comparing the corrected color metric of the toy samples to the colors in the collection of colors 112. The collection of colors 112 are represented on a color chart 435. The collection of colors 112 includes a finite number of colors used by the manufacturer on toy products. In the example of FIG. 4, the collection of colors 112 includes colors 112_1, 112_2, 112_3, 112_4, 112_5, 112_6, 112_7, 112_8. Data representing each of the colors is stored in the electronic storage 234 of the detection system 230 (FIG. 2). Each of the colors in the collection of colors 112 is associated with a range of color values. In the example of FIG. 4, the colors 112_1, 112_2, 112_3, 112_4, 112_5, 112_6, 112_7, 112_8 are associated with respective color ranges 440_1, 440_2, 440_3, 440_4, 440_5, 440_6, 440_7, 440_8. For example, there may be 256 possible colors in the image data, and each of the 256 different colors has a unique digital representation. In this example, each of the color ranges 440_1, 440_2, 440_3, 440_4, 440_5, 440_6, 440_7, 440_8 includes 32 distinct colors. The color ranges 440_1, 440_2, 440_3, 440_4, 440_5, 440_6, 440_7, 440_8 may correspond to wavelengths detected by the imaging device 232. For example, the color ranges 440_1, 440_2, 440_3, 440_4, 440_5, 440_6, 440_7, 440_8 may correspond to the following wavelengths in nanometers (nm): 440_1 (410 to 449 nm), 440_2 (450 nm to 489 nm), 440_3 (490 to 529 nm), 440_4 (530 to 569 nm), 440_5 (570 to 609 nm), 440_6 (610 nm to 649 nm), 440_7 (650 to 689 nm), 440_8 (690 to 730 nm).

To identify the toy 211 as a particular toy, the corrected color metric of the toy samples is compared to the color ranges 440_1 . . . 440_8. The corrected color metric of the toy samples is determined to have the color associated with the range in which the corrected color metric of the toy samples falls. In the example of FIG. 3, the corrected color metric has a value that is within the range 440_2 and the color of the toy samples of the toy 211 is deemed to be the color 112_2. The determined color 112_2 is compared to information in the electronic storage 234 that provides a correspondence between color and toy identity. In the example of the toy collection 110 (FIG. 1), the toy 111_2 is the only toy that includes the color 112_1. The toy 211 is identified as the toy 111_2.

If the corrected color metric of the toy samples has a value that is greater than the greatest value in the color ranges 440_1, 440_2, 440_3, 440_4, 440_5, 440_6, 440_7, 440_8, then the color of the toy samples is deemed to be the color that corresponds to the range having the largest value. For example, if the corrected color metric of the toy samples is a wavelength of 735 nm, the color of those toy samples is deemed to be in the range 440_8 and is thus the color 112_8. If the corrected color metric of the toy samples has a value that is smaller than the smallest value in the color ranges, then the color of the toy samples is deemed to be the color that corresponds to the range having the smallest value. For example, if the corrected color metric is a wavelength of 400 nm, the color of those toy samples is deemed to be in the range 440_1 and is thus the color 112_1.

In some implementations, the toy may be identified based on having a particular combination of colors. In these implementations, toy samples are obtained from more than one distinct, non-overlapping portion of the image data that represents the toy 211 but does not include a representation of the marker 215. The non-overlapping portions correspond to spatially distinct and different portions of the toy. For example, the toy 111_1 (FIG. 1) includes the torso 116, which is the color 112_1, and the arms 117, which are the color 112_5. When the image data includes a representation of a toy such as the toy 111_1, toy samples are obtained from the portions of the image data that represent the arms 117 and the torso 116. The offset determined in (315) is applied to toy samples from both portions of the image data. The color of one portion is determined to correspond to the color 112_1 and the color of the other portion is determined to correspond to the color 112_5. Because the toy 111_1 is the only toy in the collection 110 that includes both the color 112_1 and the color 112_5, the toy 211 is identified as the toy 111_1 in this example.

Applying the offset to data representing more than one distinct portion of the toy 111 may make identification more accurate. Additionally, when the collection of toys 110 includes toys of the same type, the use of two or more colors to identify a particular toy may allow finer, more granular, and more accurate identification within a product group, brand, line, branded product line, and/or branded toy line. For example, the collection of toys 110 may include a group of My Little Pony toys available from Hasbro, Inc. of Pawtucket, R.I. Some of the ponies in the collection 110 may have a purple body, but each of the ponies that have a purple body have different colored feet than the other ponies with purple bodies. By determining the color of two distinct portions of the ponies, an individual pony may be identified despite having some of the same colors as other ponies in the collection 110.

Figure 5:
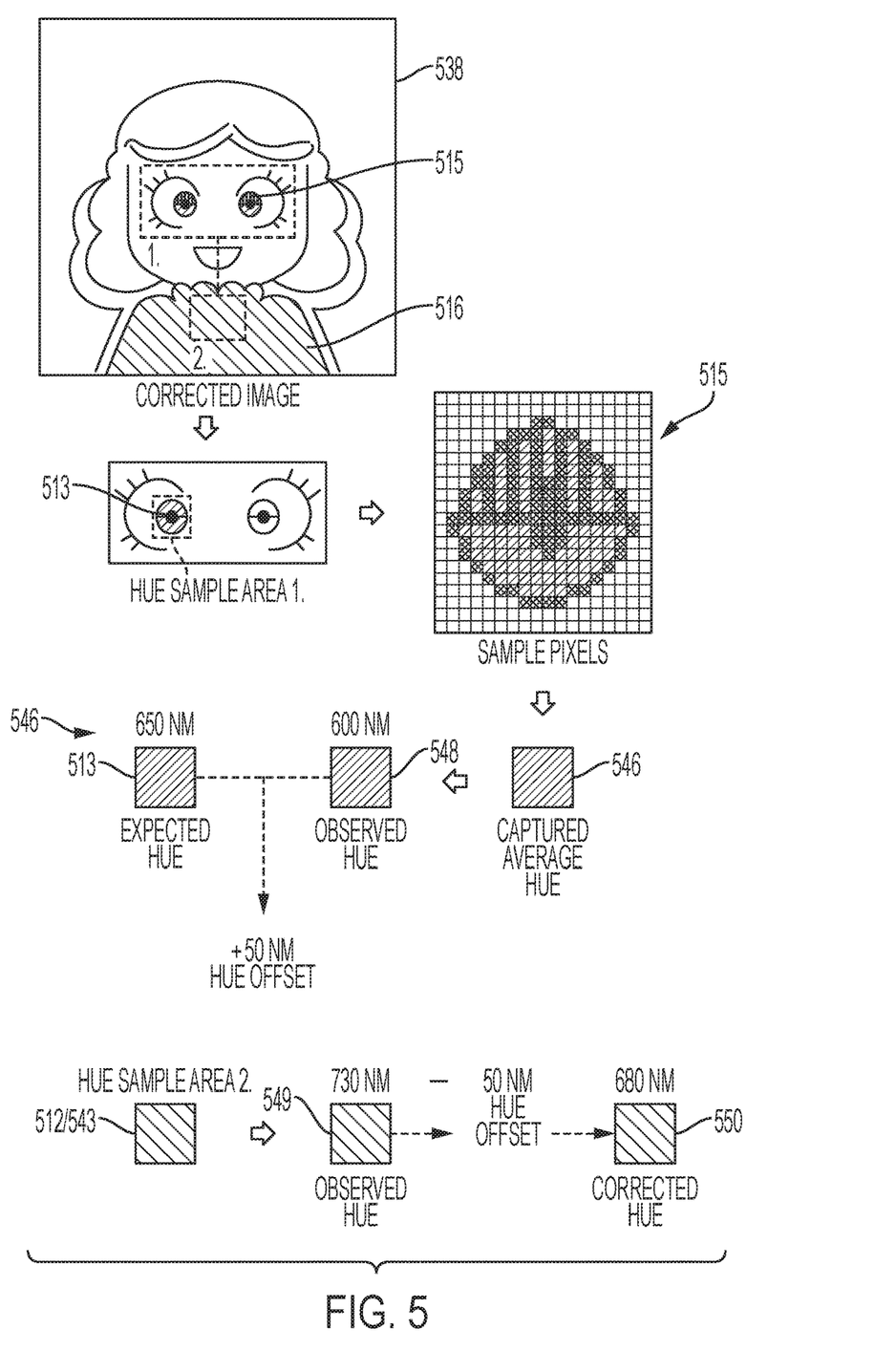
FIG. 5 is an illustration related to a process for identifying a toy.

Referring to FIG. 5, an example that illustrates the process 300 is shown. Image data 538 includes a representation of a doll toy. The doll toy is a toy that is part of a collection of toys, such as the toy collection 110 (FIG. 1). The doll toy includes a marker 515, which is also one of the eyes of the doll toy. The marker 515 is known to be a color 513. The doll toy also includes an outfit 516, which is a known color 512 that is different from the color 513. The image data 538 includes representations of the marker 515 and the outfit 516.

The eye 515 is detected without using the color 513. For example, the eye 515 may be detected based on a known shape of the eye 515. Sample pixels 546 of the eye 515 are obtained. Each of the samples 546 is associated with a color value. For example, each of the samples 546 may be pixels that have a corresponding RGB value. In the example of FIG. 5, the color value is a hue value. The color values of the sample pixels 546 are averages to determine an average sample hue 548 (an observed hue 548). In the example of FIG. 5, the observed hue is 600 nm. The actual hue of the eye 515 is known to be 650 nm. Thus, the colors represented in the image data 538 have an offset of (650 nm−650 nm)=50 nm. In other words, the represented colors in the image data 538 have a hue that is 50 nm greater than the actual hue of the physical doll toy.

The offset is applied to the representation of the outfit 516 to determine an estimated color of the outfit 516. Samples 543 of the outfit 516 are obtained, and each of the samples 543 is associated with a color value. The color values of the samples 543 are averaged to determine an observed hue 549. In the example of FIG. 5, the observed hue 549 is 730 nm. The hue offset of 50 nm is applied to the observed hue 549 to determine a corrected hue 550. In this example, the corrected hue 550 is (730 nm−50 nm)=680 nm. The corrected hue 550 is compared to the color ranges 440_1 . . . 440_8 to determine the color of the outfit 516. The color is deemed to be 112_7 (FIG. 4), and the doll toy and/or outfit 516 is identified based on being the color 112_7.

Figure 6:
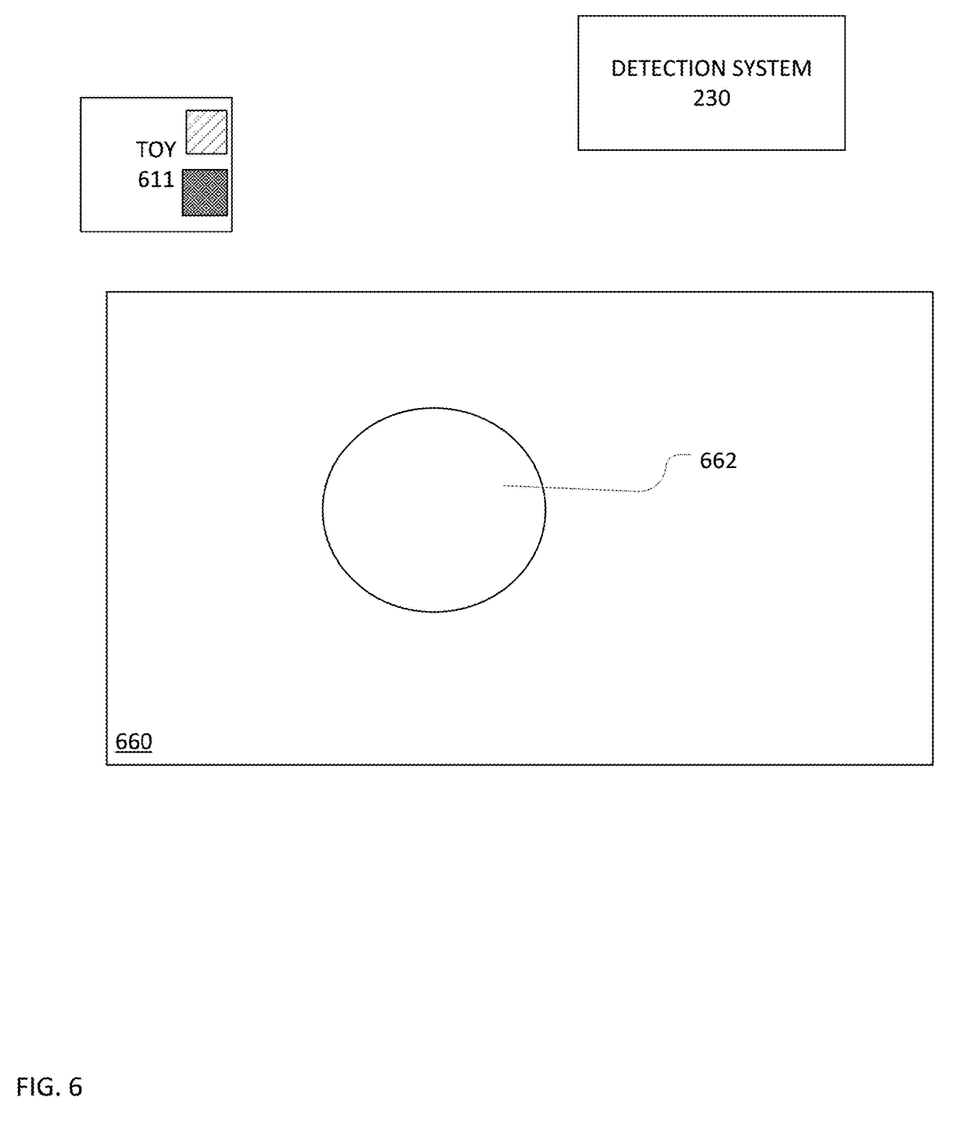
FIG. 6 is a block diagram of a play surface.

Referring to FIG. 6, a block diagram of a play surface 660 is shown. The play surface 600 includes a toy region 662. The play surface 660 may be used in an implementation in which one or more toys in a collection of toys does not include a marker (such as the marker 115). In the example of FIG. 6, one toy 611 is shown for illustration purposes. The toy 611 does not include a marker, but the toy 611 does include two colors (112_1 and 112_2), with each color being on a distinct and non-overlapping portion of the toy 611. The toy 611 may include more than two colors.

In the implementation of FIG. 6, the detection system 230 prompts a user to place the toy 611 in the toy region 662 at a particular orientation relative to the detection system 230. The prompts may be provided to the user via the I/O interface 238 (FIG. 2). For example, the prompts may be audible prompts that instruct the user as to how to place the toy 611 in the toy region 662, or the prompts may be visual cues (such as images) that show the user how to place the toy 611 in the toy region 662. This results in a known portion of the toy 611 being within the field of view of the optical sensor of the imaging device 232 (FIG. 2). In this example, the detection system 230 prompts the user to place a portion of the toy 611 that has the color 112_1 in the field of imaging device 232. The detection system 230 then implements a process similar to the process 300, except no marker is detected and the region in the field of view of the optical sensor of the imaging device 232 is sampled instead of sampling the marker 115. Because the detection system 230 prompted the user to place a particular portion of the toy 611 in the toy region 662, the color of the portion imaged by the imaging device 232 is known. Similar to the process 300, the detected color of the portion imaged by the imaging device 232 is compared to the known color (the color 612_1) and the discrepancy (if any) is used to determine an offset. The offset is then used to determine that the color of another portion of the toy is the color 112_2. Either or both of the colors 112_1 and 112_2 are used to identify the toy 611 as a particular toy, or a particular type of toy, within a collection of toys.

Figure 7:
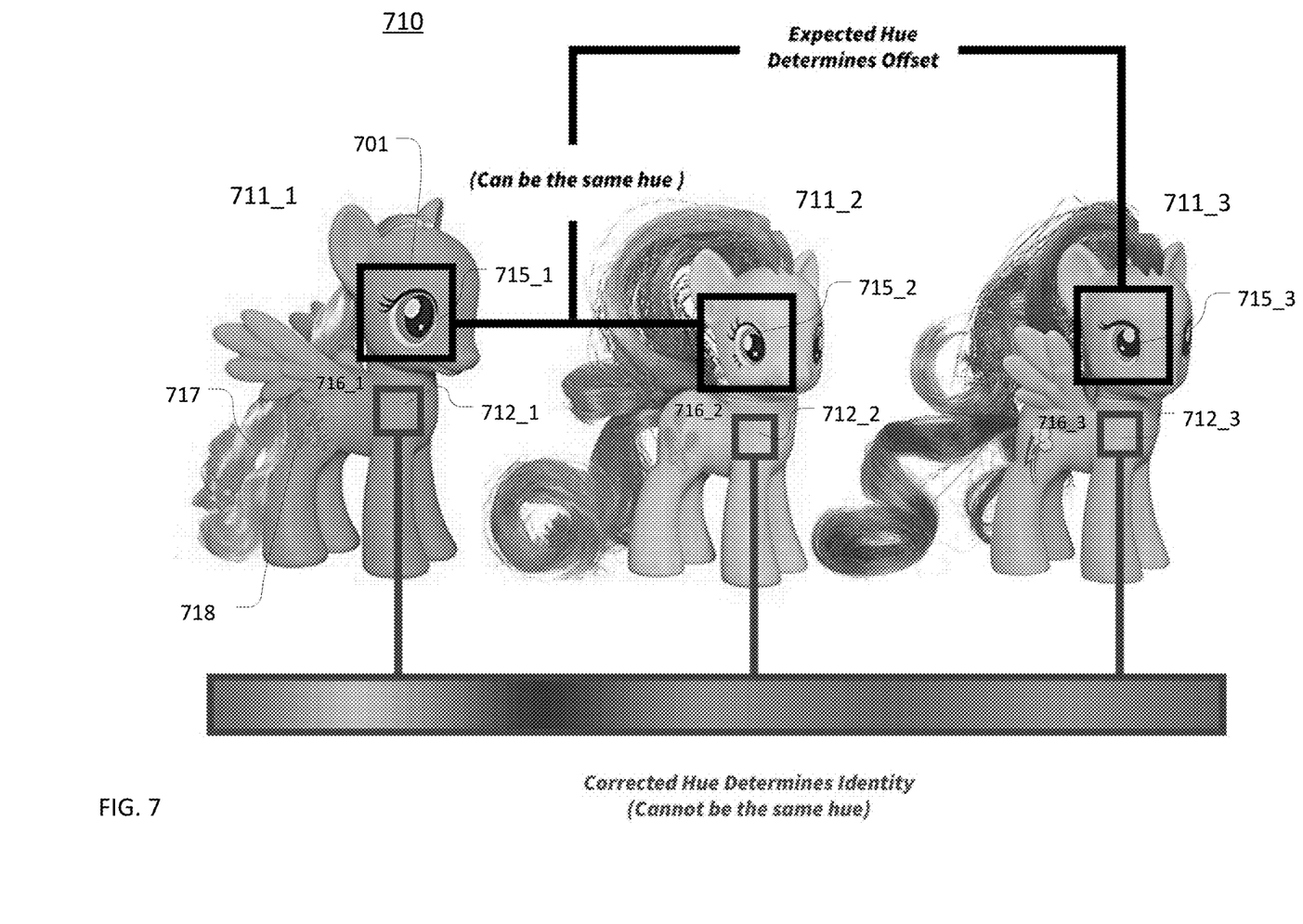
FIG. 7 are illustrations related to a process for identifying a toy.

FIG. 7 is an illustration of an example of a toy collection 710. The toy collection 710 includes toys 711_1, 711_2, and 711_3. In the example of FIG. 7, the toys 711_1, 711_2, 711_3 belong to the same product group, which is My Little Pony™ available from Hasbro, Inc. of Pawtucket, R.I. The toys 711_1, 711_2, and 711_3 are also the same type of toy (ponies).

The process 300 (FIG. 3) may be used to identify any of the toys 711_1, 711_2, 711_3. Each of the toys 711_1, 711_2, 711_3 includes a respective eye portion 715_1, 715_2, 715_3. The eye portions 715_1, 715_2, 715_3 have known, non-color related characteristics that allow the eye portions to be detection without using color. For example, the eye portions 715_1, 715_2, 715_3 may have different shapes, different eyelash placement, different eyelash spatial design, and/or different pupil placement. Additionally, the colors of the eye portions 715_1, 715_2, 715_3 are known.

Each of the toys 711_1, 711_2, 711_3 also includes a respective body portion 716_1, 716_2, 716_3 that is a portion of the toy that does not include any part of the eye portion. The body portion 716_1 is a color 712_1, the body portion 716_2 is a color 712_2, and the body portion 716_3 is a color 712_3. The colors 712_1, 712_2, and 712_3 are different colors. For example, the color 712_1 may be yellow, the color 712_2 may be pink, and the color 712_3 may be blue.

In the example of FIG. 7, the eye portions 715_1, 715_2, 715_3 are used as markers (such as the marker 115 discussed above). To identify any of the toys 711_1, 711_2, 711_3, the eye portion of that toy is detected based on characteristics that are unrelated to the color of the eye portion. For example, to identify the toy 711_1, an image of the toy 711_1 is captured. The image includes image data 701 that represents the eye portion 715_1. The eye portion 715_1 is detected in the image using non-color characteristics, such as shape, placement of the pupil, and/or eyelash style. Because the non-color characteristics of the eye portions 715_2 and 715_3 are not identical to the non-color characteristics of the eye portions 715_2 and 715_3, the non-color characteristics also may be used to determine that the detected eye portion is the eye portion 715_1.

A color metric that represents a detected, measured, or sensed color of the eye portion 715_1 is determined from the image data. For example, the hue of the eye portion 715_1 may be determined from the image data using pixels that are within the area deemed to be part of the representation of the eye portion 715_1. This hue is a measured hue or a measured color metric.

The color or colors of the eye portion 715_1 is known prior to the identification process. Thus, the eye portion 715_1 has a known color metric, an actual color metric, or an expected color metric. A color metric offset is determined from the measured color metric and the known color metric of the eye portion 715_1. This offset is applied to a portion of the image data that does not include the eye portion 715_1. For example, the offset may be applied to a portion of the image data that represents the body 716_1. Applying the offset corrects the color of the body 716_1. After the offset is applied, a corrected color metric of the body 716_1 is used to identify the toy as the toy 711_1.

In the above example, each of the toys in the collection 710 have at least a portion of a surface that is different color from all of the other toys in the collection 710. Thus, the individual toys may be identified based on the color after the offset is applied. The eye portions 715_1, 715_2, 715_3 have different spatial characteristics to aid in detection without using color-based characteristics. The eye portions 715_1, 715_2, 715_3 may all have the same color or may be different color. The color or colors of each of the eye portions 715_1, 715_2, 715_3 is known beforehand. As such, regardless of the colors of the eye portions, the measured color metric and the known color of the eye portions may be used to determine the offset.

In the above example, the body portion of the ponies have different colors to allow for color-based identification. However, other portions of the ponies may be used for this purpose. For example, a tail 717_1 or decorative design 718_1 may be used for color-distinction on ponies that have the same body color.

Other implementations are within the scope of the claims. For example, the collection of colors 112 may include more or fewer colors than the eight colors provided in the examples above. The selection of the number and type of colors for the collection of colors 112 may depend on the characteristics of the detection system that uses the collection of colors. For example, the collection of colors should include a sufficient number of colors to represent the main colors used on the toys in the collection 110. However, the colors within the collection of colors should be sufficiently distinct from each other to allow for accurate identification of toys based on color. For example, for an imaging device (such as the imaging device 232) that is capable of representing 255 distinct colors, ten colors may be selected for the collection of colors 112. The 10 colors may be equally spaced from each other in color space. For example, the difference in RGB values between any two neighboring colors may be the same.

In some implementations, image data for colors that are candidates for inclusion in the collection of colors 112 may be collected under different lighting conditions. The candidate colors may be implemented as physical samples of plastic or cloth of a particular color, referred to as swatches. Image data of all of the candidate swatches is collected, and a process that samples the representation of the swatch and determines an offset such as, for example, elements 310 and 315 of the process 300, is applied to all of the color samples. The colors corresponding to the swatches in which the actual hue of the swatch is consistently obtained after applying the offset and across a variety of lighting conditions may be selected for inclusion in the collection of colors 112.

What is claimed is:

1. A method of identifying a toy as a particular one of a plurality of pre-identified toys, the method comprising:
   locating a marker within image data based on one or more pre-known and optically detectable characteristics of the marker, the image data comprising data that represents a toy and data that represents the marker;
   obtaining one or more marker samples, each of the one or more marker samples comprising a measured value of a color metric of the marker;
   determining a color metric offset based on the one or more marker samples and a known value of the color metric of the marker;
   obtaining one or more toy samples, each of the one or more toy samples comprising a measured value of the color metric of the toy;
   applying the determined color metric offset to at least one of the toy samples to determine a corrected color metric of the toy; and
   identifying the toy as a particular one of a plurality of pre-identified toys based on the corrected color metric of the toy.

2. The method of claim 1, wherein the color metric comprises a hue.

3. The method of claim 1, wherein the portion of the image data that comprises data that represents the toy does not comprise data that represents the marker.

4. The method of claim 1, wherein more than one marker sample is obtained, and further comprising averaging the measured values of the marker samples to determine an average marker sample, wherein determining the color metric offset comprises determining the color metric offset based on the average marker sample and the known value of the color metric of the marker.

5. The method of claim 4, wherein determining the color metric offset comprises determining a difference between the average marker sample and the known value of the color metric of the marker.

6. The method of claim 5, wherein applying the determined color metric offset to at least one of the toy samples comprises adding the determined color metric offset to the measured value of the color metric of at least one toy sample.

7. The method of claim 1, wherein the marker samples are obtained from the image data, and the toy samples are obtained from the image data.

8. The method of claim 7, wherein the toy samples and the marker samples are obtained from separate and non-overlapping portions of the image data.

9. The method of claim 7, wherein the image data is obtained from a single optical sensor.

10. The method of claim 1, wherein the pre-known and optically detectable characteristics of the marker comprise a shape of the marker, a size of the marker, a relative location of the marker, a reflectivity of the marker, and/or a texture of the marker.

11. The method of claim 1, wherein each of the pre-identified toys is associated with a distinct range of color metric values, and identifying the toy as a particular one of a plurality of pre-identified toys based on the corrected color metric of the toy comprises:
determining which one of the distinct ranges of color metric values includes the corrected color metric of the toy; and
identifying the toy as the particular toy associated with the determined one of the distinct ranges of color metric values.

12. The method of claim 11, wherein each of the distinct ranges of color metric values comprises a distinct range of hue values.

13. The method of claim 1, wherein the one or more toy samples are samples of a first portion of the toy, and the corrected color metric of the toy comprises a corrected color metric of the first portion of the toy, and further comprising:
obtaining one or more second toy samples, the second toy samples comprising a measured value of the color metric of a second portion of the toy, the second portion of the toy being spatially distinct from the first portion; and
applying the determined color metric offset to at least one of the second toy samples to determine a corrected color metric of the second portion of the toy, and
wherein identifying the toy as a particular one of a identifying the toy as a particular one of a plurality of pre-identified toys based on the corrected color metric of the toy comprises identifying the toy based on the corrected color metric of the first portion of the toy and the second portion of the toy.

14. A toy identification system comprising a detection system configured to capture image data, the detection system being configured to:
locate a marker within image data based on one or more pre-known and optically detectable characteristics of the marker, the image data comprising data that represents a toy and data that represents the marker;
obtain one or more marker samples, each of the one or more marker samples comprising a measured value of a color metric of the marker;
determine a color metric offset based on the one or more marker samples and a known value of the color metric of the marker;
obtain one or more toy samples, each of the one or more toy samples comprising a measured value of the color metric of the toy;
apply the determined color metric offset to at least one of the toy samples to determine a corrected color metric of the toy; and
identify the toy as a particular one of a plurality of pre-identified toys based on the corrected color metric of the toy.

15. A method of identifying a toy, the method comprising:
determining that a toy is in a toy region of a play surface;
directing a user to position the toy relative to a detection system such that a first portion of the toy is in the field of view of an optical sensor of the detection system;
obtaining one or more first portion samples, each of the one or more first portion samples comprising a measured value of a color metric of the first portion of the toy;
determining a color metric offset based on the one or more first portion samples and a known value of the color metric of the first portion of the toy;
obtaining one or more toy samples, each of the one or more toy samples comprising a measured value of the color metric of the toy in a second portion of the toy, the second portion of the toy being spatially distinct from the first portion of the toy and being a different color than the first portion;
applying the determined color metric offset to at least one of the toy samples to determine a corrected color metric of the toy; and
identifying the toy as a particular one of a plurality of pre-identified toys based on the corrected color metric of the toy.

16. The method of claim 15, further comprising:
obtaining one or more second toy samples, each of the one or more second toy samples comprising a measured value of the color metric of the toy in a third portion of the toy, the third portion of the toy being spatially distinct from the first portion of the toy and being a different color than the first portion and being distinct from the second portion of the toy and being a different color than the second portion of the toy; and
applying the determined color metric offset to at least one of the second toy samples to determine the corrected color metric of the toy.

17. The toy identification system of claim 14, wherein the color metric comprises a hue.

18. The toy identification system of claim 14, wherein the detection system is configured to obtain more than one marker sample, and the detection system is further configured to average the measured values of the marker samples to determine an average marker sample, and wherein to determine the color metric offset, the detection system is configured to determine the color metric offset based on the average marker sample and the known value of the color metric of the marker.

19. The detection system of claim 18, wherein to determine the color metric offset, the detection system is configured to determine a difference between the average marker sample and the known value of the color metric of the marker.

20. The detection system of claim 19, wherein to apply the determined color metric offset to at least one of the toy samples, the detection system is configured to add the determined color metric offset to the measured value of the color metric of at least one toy sample.

* * * * *